United States Patent Office 3,421,422
Patented Jan. 14, 1969

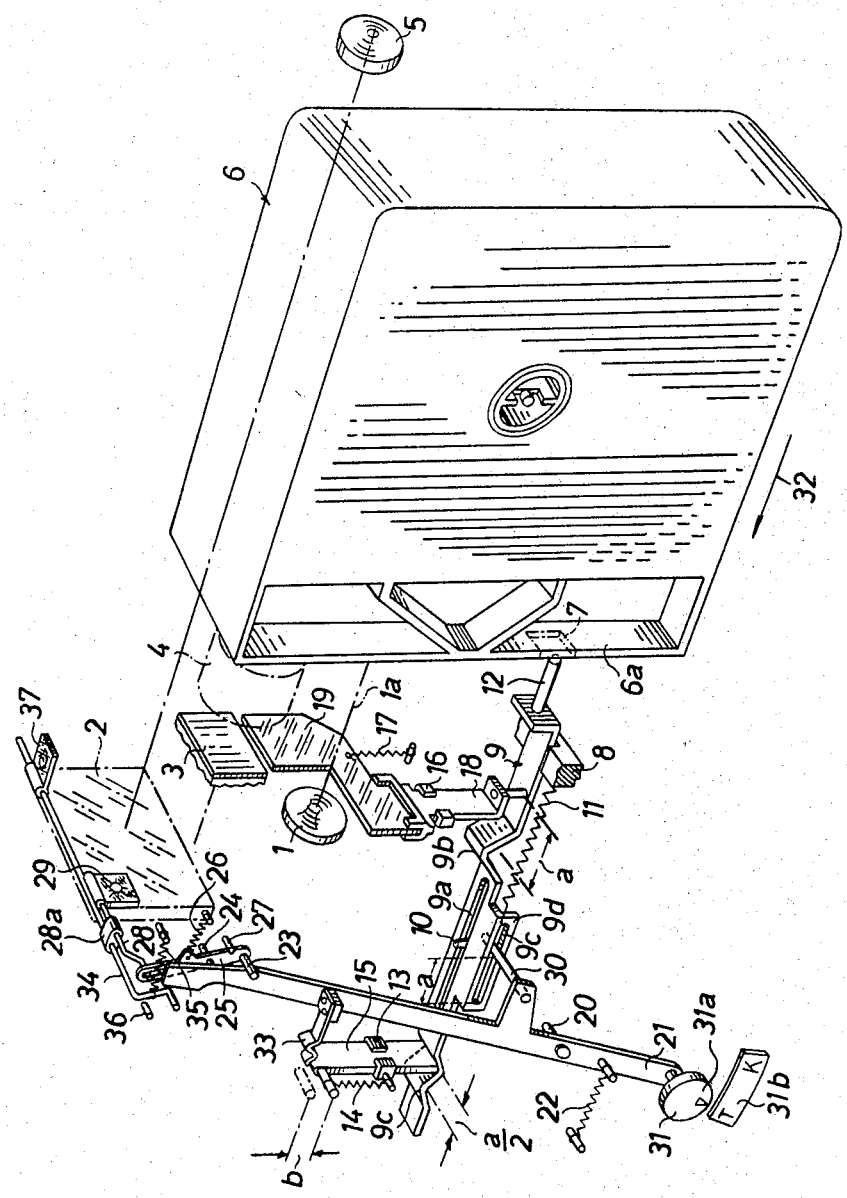

3,421,422
CAMERA
Alfred Winkler, Munich, Germany, assignor to Agfa-Gevaert Aktiengesellschaft, Leverkusen, Germany
Filed Mar. 15, 1966, Ser. No. 534,440
Claims priority, application Germany, Mar. 27, 1965,
A 48,756
U.S. Cl. 95—11                                    27 Claims
Int. Cl. G03b 19/00

ABSTRACT OF THE DISCLOSURE

A motion picture camera which uses magazines containing daylight and artificial-light film and having markers which indicate the type of the film therein. The camera consists of a displacing member which is movable between three positions including a first position in response to engagement with a marker of a magazine for daylight film and a second position in response to engagement with a marker of a magazine for artificial-light film. A selector can move the displacing member to the third position to thereby move or maintain a filter away from the path of incoming light. The filter is located away from such path in the first position and extends across such path in the second position of the selector. When the artificial-light film is to be used in artificial light, the operator actuates the selector to effect movement of the filter away from the light path by way of the displacing member which then assumes the third position.

---

The present invention relates to cameras in general, and more particularly to improvements in motion picture cameras or still cameras which may be used with cartridges, boxes and other types of magazines containing different types of film. Still more particularly, the invention relates to improvement in cameras wherein a conversion filter may be moved into and from the path of incoming light rays to enable the operator to use a daylight film in artificial light, or vice versa.

It is already known to store different types of film in similar magazines and to provide the magazines with specially configurated markers which are indicative of the type of film in the respective magazine. Such markers are used to effect movements of a conversion filter to or from operative position (i.e., into and from the path of light rays which pass through the objective) in order to insure that a daylight film can be used in artificial light, or vice versa. If the camera is equipped with a built-in exposure meter which controls one or more exposure values (for example, the size of the diaphragm opening) as a function of the intensity of incoming light, the exposure meter must be calibrated to insure satisfactory exposure when the daylight film is used in artificial light, or vice versa. All presently known cameras of the above outlined type are quite complicated, expensive and prone to malfunction.

Accordingly, it is an important object of the present invention to provide a very simple, compact and inexpensive camera which can use two different film types and which is equipped with a conversion filter so that daylight film may be used in artificial light or vice versa.

Another object of the invention is to provide a camera of the just outlined type with a very simple and rugged mechanism which can effect automatic or manually induced movements of a conversion filter to and from operative position.

A further object of the invention is to provide a camera for use with two types of film which is further equipped with readily observable indicator means serving to inform the user whether the film in a magazine which is contained in or supported by the camera housing is ready to be used in daylight or in artificial light.

An additional obect of the invention is to provide a novel operative connection between a magazine which is supported by the camera housing and the conversion filter.

Still another object of the invention is to provide a very simple manually operable selector structure which enables the operator to use a given type of film in daylight or in artificial light and to set the camera for taking pictures in daylight or in artificial light without necessitating removal of the magazine.

A concomitant object of the instant invention is to provide an indicator assembly whose operation is fully automatic and which can enable the user of the camera to determine not only the type of film which is being used in the camera but also the position of the conversion filter.

Another object of the invention is to provide a camera which embodies the above outlined structure and wherein such structure may be accommodated in a small area and may be operated by markers provided on a front wall, side wall and/or other portion of a magazine.

Briefly stated, one feature of my present invention resides in the provision of a motion picture camera or still camera for use with magazines containing two different types of film and provided with different markers each of which is indicative of the respective film type. The camera comprises a housing for detachably supporting one magazine at a time (the housing can support several magazines but only one such magazine is located in operative position), an objective supported by the housing and arranged to admit light rays to the film in that magazine which is supported by the housing in operative position, a displacing member (which may resemble a slide or a lever) mounted in the housing for movement between three positions the first and the second of which it respectively assumes in response to engagement or lack of engagement with the markers of magazines containing first and second film types, movable selector means (which may resemble a lever or a slide) for moving the displacing member to the third position, conversion filter means movable between operative and idle positions respectively located in and outside of the path of light rays passing through the objective, and an operative connection between the displacing member and the filter means (including, for example, a cam on the displacing member and a follower coupled with the filter means) for moving the filter means from one of its positions to the other position in response to movement of the displacing member to third position.

If the first film type is a daylight film of given sensitivity and the second film type is an artificial-light film of the same sensitivity, the displacing member will move the filter means to operative position in response to insertion of a magazine which contains the second type of film. The filter means may be of such character that, when placed in front of the light-admitting opening of the magazine which contains artificial-light film, it enables the camera to take pictures in daylight, i.e., the artificial-light film is then used as daylight film of lesser sensitivity. By causing the selector means to effect movement of the displacing member to third position and to thereby return the filter means to idle position, the operator prepares the camera for taking pictures in artificial light.

The novel features which are considered as characteristic of the invention are set forth in particular in the appended claims. The improved camera itself, however, both as to its construction and its mode of operation, together with additional features and advantages thereof, will be best understood upon perusal of the following detailed description of a specific embodiment with reference to the accompanying drawing the single illustration of which is a fragmentary exploded perspective view of a motion picture camera which embodies one form of my invention, the housing and certain other component parts of the camera being broken away.

Referring now to the drawing in detail, there is shown a portion of a motion picture camera having an objective 1, a viewfinder including two lenses 2, 5 or an analogous device providing a field of view enabling the photographer to observe a subject or scene which is to be photographed, a honeycomb lens 3 located in front of a light-sensitive exposure meter 4 which controls the size of the diaphragm opening in a manner not forming part of the present invention, and a chamber (not shown) which is defined by the camera housing 8 and which can accommodate a removable magazine 6 containing a supply of movie film. The magazine 6 is assumed to contain daylight film of a predetermined sensitivity, and its front wall 6a is provided with a marker which is indicative of the type of film. In the present instance, the marker is simply a smooth portion of the exposed left-hand surface on the front wall 6a.

The aforementioned chamber of the housing 8 can accommodate a magazine of a second type which contains an artificial-light film of the same predetermined sensitivity. However, and in order to facilitate discrimination between the two film types, the front wall of the second magazine is provided with a different marker, for example, with a marker in the form of a cutout or recess 7 which is shown in the drawing by phantom lines because it is formed on the non-illustrated second magazine for artificial-light film. If the chamber of the camera contains a magazine with artificial-light film, and if a conversion filter 19 is moved into the path of light rays passing through the objective 1 as well as into the path of light rays which pass through the lens 3 to reach the light-sensitive element of the exposure meter 4, the artificial-light film can be used as a daylight film of lesser sensitivity. In other words, by resorting to two different types of film (namely, a daylight film and an artificial-light film), the operator can treat these films as if he had a choice between three different types of film, to wit: two daylight films of higher and lower sensitivity respectively, and an artificial-light film of higher sensitivity. This is made possible by providing the camera with the conversion filter 19 which can be moved between an operative position and an idle position in which it is respectively located in and outside of the path of incoming light rays.

The mechanism of the camera comprises a displacing member 9 (hereinafter called slide for short) which is reciprocable with reference to the housing 8 of the camera and is guided therein by a pin-and-slot connection 10, 9a so that it can move in directions at right angles to the plane of the front wall 6a and in substantial parallelism with the optical axis 1a. A spring 11 biases the slide 9 in a direction to the right, as viewed in the drawing, so that a suitable tracking or scanning pin 12 of the slide abuts against the aforementioned marker on the front wall 6a of the magazine 6 when the latter is properly accommodated in its chamber. It will be noted that the tracking pin 12 engages that portion of the front wall 6a which would be provided with the cutout 7 were the magazine 6 replaced by a second magazine which contains artificial-light film.

The slide 9 is further provided with two projections or cams 9b, 9c and with a bent-over flap 9d having an elongated coupling slot 9e. The slots 9a, 9e are located in two mutually inclined planes but are parallel to each other.

The housing 8 of the movie camera carries or is provided with suitable ways 13 for a vertically reciprocable follower 15 which is biased by a helical spring 14 so that its lower end face abuts against the slide 9 in the region of the front cam 9c. A second follower 18 is reciprocable in ways 16 and is biased by a helical spring 17 so that its lower end face abuts against the slide 9 in the region of the rear cam 9b. The follower 18 serves as a holder for the conversion filter 19 which latter may be moved not only behind the objective 1 but also behind the lens 3 through which pass all of the light rays travelling to the light-sensitive element of the exposure meter 4. The spring 17 tends to withdraw the filter 19 from the path of such light rays, i.e., to the idle position, and simultaneously urges the pin-shaped lower end of the follower 18 against the slide 9. The followers 15 and 18 are movable in directions at right angles to the direction of movement of the slide 9, and this slide is movable between three different positions the first of which is shown in the drawing.

The housing 8 of the camera is further provided with a horizontal pivot pin 20 for a two-armed selector lever 21 which is biased by a resilient element here shown as a helical spring 22 so that it tends to rotate in a clockwise direction, as viewed in the drawing, and to assume a position of rest whereby its upper arm abuts against a rocking pin 23 provided on the lower arm of a small adjusting lever 25. The lever 25 forms part of an indicator assembly and is rockable on a fixed pivot pin 24. A relatively weak resilient element in the form of a helical spring 26 tends to rotate the lever 25 in a clockwise direction. However, and since the spring 22 is stronger than the spring 26, the upper arm of the selector lever 21 can maintain the lower arm of the adjusting lever 25 in abutment with a pin-shaped arresting member 27 which is affixed to the housing 8 of the camera. The upper arm of the adjusting lever 25 is slotted to receive the crank pin of a crank shaft 28 which is turnable in a fixed bearing 28a and carries an indicator or index 29 adapted to be swung between an exposed and a concealed position, namely, into and from the field of view provided by the viewfinder lenses 2 and 5. In the illustrated exposed position, the index 29 is located directly behind the front lens 2 and is observable by a person looking through the rear lens 5. If the spring 26 is free to contract, the adjusting lever 25 swings the index 29 into a horizontal plane and out of the field of view, i.e., the index 29 is then concealed. In the illustrated embodiment, the observable side of the index 29 carries a symbol in the form of a sun which indicates to the observer that the magazine 6 which has been introduced into the camera contains daylight film or that an artificial-light film is ready to be used as a daylight film of lesser sensitivity because the conversion filter 19 is moved to its operative position and is located behind the objective 1 and lens 3.

The upper arm of the selector lever 21 further carries a combined coupling and motion transmitting post 30 which extends into the slot 9e of the slide 9 and can displace the slide to a third position when the magazine contains artificial-light film. The lower arm of the selector lever 21 carries a manually movable actuating member in the form of a knob 31 which is provided with an index 31a cooperating with a fixed scale 31b provided with two graduations T and K. The graduation T indicates daylight film or exposures in daylight, and the graduation K indicates exposures in artificial light.

Since the magazine 6 which is shown in the drawing contains daylight film, its front wall 6a does not have a cutout 7 and, therefore, this front wall maintains the slide 9 in the illustrated first position. The follower 18 does not engage the cam 9b and the spring 17 is free to maintain this follower in its lower end position so that the filter 19 is withdrawn from the path of incoming light rays and assumes its idle position. The front cam 9c defines a groove or valley which accommodates the lower end of the follower 15 so that the latter also assumes its lower end position because it is biased by the spring 14. The index 31a registers with the graduation T and the upper arm of the selector lever 21 maintains the adjusting lever 25 in abutment with the arresting member 27 so that the index 29 is exposed by being located behind the lens 2 and is observable by the photographer. This indicates to the user that the camera is ready to take pictures in daylight.

If the magazine 6 is replaced by a second magazine which contains artificial-light film and whose front wall is provided with a cutout 7, insertion of the second magazine in the direction indicated by the arrow 32 will not result in any displacement of the slide 9 because the tracking pin 12 is free to extend into the cutout 7. Thus, the spring 11 is free to contract and shifts the slide 9 in a direction to the right until the post 30 abuts against the surface at the left-hand end of the slot 9e. The slide 9 then assumes a second position in which it is displaced by a distance $a$ with reference to the first position which is shown in the drawing, and the distance $a$ is selected in such a way that the follower 18 then abuts against the crest of the cam 9b so that the filter 19 moves upwardly against the bias of the spring 17 and assumes its operative position in which it is located in the path of light rays passing through the objective 1 and lens 3. The selector lever 21 remains in the illustrated position of rest and the index 31a continues to register with the graduation T because the artificial-light film in the second magazine is ready to be used in daylight. This will be readily understood since the filter 19 is held in its operative position. Therefore, the index 29 also remains in the illustrated exposed position and the user knows that he can take pictures in daylight. The exposure meter 4 is calibrated in a fully automatic way because the filter 19 extends into the space between the lens 3 and the light-sensitive element.

The distance between the two valleys at the opposite sides of the front cam is $a$ so that, when the follower 18 engages the crest of the rear cam 9b, the front follower 15 remains in its lower end position.

If the film in the second magazine is to be utilized in artificial light, the filter 19 must be returned to its idle position. This is achieved by rocking the selector lever 21 from the position of rest through the intermediary of the knob 31 so that the index 31a registers with the graduation K. The transmission ratio between the lever 21 and slide 9 is selected in such a way that rocking of the index 31a into registry with the graduation K causes the post 30 to displace the slide 9 by a distance $a/2$ (in a direction to the left, as viewed in the drawing) whereby the slide assumes a third position, the follower 18 slides off the crest of the associated cam 9b, and the spring 17 automatically returns the filter 19 to its idle position. At the same time, the follower 15 is raised by a distance $b$ (as shown by phantom lines) because it rides on the crest of the front cam 9c so that its upper end is engaged by a suitably configured detent spring 33 which is provided on the upper arm of the lever 21. The spring 33 is strong enough to retain the lever 21 in the new or other position in which the index 31a registers with the graduation K. The spring 33 then overcomes the bias of the spring 11 and of spring 22 both of which tend to turn the selector lever 21 in a clockwise direction and back to the position of rest.

In its new or other angular position, the selector lever 21 has moved its upper arm away from the arresting member 27 so that the adjusting lever 25 can follow the bias of its spring 26 and is rocked in a clockwise direction to turn the crank shaft 28 and to thereby turn the index 29 into a horizontal plane and out of the field of view, i.e., the index 29 is concealed. At the same time, the upper arm of the lever 21 engages and rocks the pin of a second crank shaft 34 so that the latter moves into abutment with a fixed stop pin 36 and expands its return spring 35. The shaft 34 carries a second index 37 which is then pivoted downwardly to an exposed position and into the field of view. The symbol on the rear side of the index 37 may resemble a flash bulb so that the user then knows that the camera is ready to take pictures in artificial light. The spring 35 automatically retracts the shaft 34 to the position which is shown in the drawing to conceal the index 37 if the selector lever 21 is rocked back to the position of rest in which the index 31a registers with the graduation T. In the illustrated embodiment, the indexes 29 and 37 are turnable back and forth through angles of 90 degrees, and it will be noted that these indexes are located in planes which make right angles with each other.

If the user thereupon again decides to use the artificial-light film in daylight (i.e., as a daylight film of lesser sensitivity), he simply returns the index 31a into registry with the graduation T on the scale 31b whereby the force transmitted to the lever 21 overcomes the retaining action of the detent spring 33. The follower 15 descends and the follower 18 rises to the crest of the cam 9b so that the filter 19 moves upwardly behind the objective 1 and lens 3 to insure that the exposure meter 4 is properly calibrated and that a smaller amount of light can reach the next film frame. The displacement of the slide 9 in response to such rocking of the lever 21 back to the position of rest which is shown in the drawing again equals $a/2$. The lever 21 then releases the crank shaft 34 so that the index 37 moves into a horizontal plane and is concealed. At the same time, the lever 21 rocks the lever 25 so that the latter returns into abutment with the arresting member 27 and moves the index 29 back to the exposed position.

By removing the magazine for artificial-light film and by replacing it with a magazine 6 of the type shown in the drawing, the parts of the camera mechanism again assume the illustrated positions and the camera is ready to take pictures in daylight with a daylight film of high sensitivity. Even if the user should forget to move the index 31a into registry with the graduation T, such movement of the index 31a will take place in a fully automatic way because, when the camera contains a magazine 6, the front follower 15 can descend into the valley of the cam 9c so that the latter is disengaged from the detent spring 33 whereby the spring 22 automatically rocks the selector lever 21 to the position of rest. Such return movement of the lever 21 under the bias of the spring 22 causes the index 37 to disappear under the action of the spring 35 and the index 29 reappears so that the user knows that the camera contains daylight film.

Of course, the improved camera is susceptible of many modifications without departing from the spirit of the present invention. For example, the arrangement may be such that a suitable filter is moved into the path of incoming light rays when the inserted magazine contains daylight film which is to be used for taking pictures in artificial light. The movement of the lever 21 to place the index 31a into registry with the right-hand graduation on the scale 31b will then result in withdrawal of the filter from the path of incoming light rays.

Furthermore, the structure which is shown in the drawing could be modified by replacing the one-piece filter 19 with a pair of filters the first of which is movable behind the objective 1 and the second of which is movable behind the lens 3. The second filter need not change its position in automatic response to insertion of a magazine with artificial-light film but the first filter does. The camera is then provided with a second selector which can be utilized to move the second filter into and from the path of light rays which travel toward the light-sensitive element of the exposure meter. When the selector lever 21 is moved to its other position (i.e., when it places the index 31a into registry with the right-hand graduation of the scale 31b) to move the first filter out of the path of light rays which pass through the objective 1, and when the second selector is actuated to calibrate the exposure meter (either by changing the initial position of the exposure meter or by placing the second filter into the path of light rays travelling to the exposure meter), the camera is ready to use the artificial-light film in artificial light.

It is further clear that the markers on the front walls of the magazines may take the form of projections and that such markers need not necessarily be provided on the front walls. For example, and depending on the direction in which the magazine must move in order to enter or leave its chamber, the markers (in the form of smooth surface portions, cutouts, recesses, openings and/or projections) may be provided on a side wall of the magazine, on two side walls, or on a side wall and on the front wall. The exact position of the markers on the magazines will also depend on the size and locale of space which is available in the housing of a camera for the improved mechanism.

Finally, the mechanism proper may be modified in a number of ways, for example, by replacing the selector lever 21 with a slide and/or by replacing the slide 9 with a lever.

The daylight film may be color film or black-and-white film. The same holds true for the artificial-light film. Also, the viewfinder may be of the type which receives deflected light or the members 29, 37 may be tilted or otherwise moved in front of or behind a separate window provided therefor in the housing 8 so that the indicator assembly including the members 29, 37 will be a separate entity still controlled by the selector 21 but having no connection with the viewfinder.

Without further analysis, the foregoing will so fully reveal the gist of the present invention that others can, by applying current knowledge, readily adapt it for various applications without omitting features which fairly constitute essential characteristics of the generic and specific aspects of my contribution to the art.

What is claimed as new and desired to be protected by Letters Patent is:

1. In a camera for use with magazines containing two different types of film and provided with different markers each indicative of the respective film type, a housing for detachably supporting one magazine at a time; an objective supported by said housing and arranged to admit light rays to the film in that magazine which is supported by said housing; a displacing member mounted in said housing for movement between three positions the first and second of which it respectively assumes in response to engagement with the markers of magazines containing first and second types of film; movable selector means for moving said displacing member to the third of said positions; conversion filter means movable between operative and idle positions respectively located in and outside of the path of light rays passing through said objective; an operative connection between said displacing member and said filter means for moving said filter means from one of its positions to the other position in response to movement of said displacing member to third position; and exposure meter means carried by said housing and positioned in the path of incoming light, said filter means comprising a portion located in the path of incoming light in the operative position of said filter means.

2. A structure as set forth in claim 1, wherein said filter means comprises a single filter.

3. In a camera for use with magazines containing two different types of film and provided with different markers each indicative of the respective film type, a housing for detachably supporting one magazine at a time; an objective supported by said housing and arranged to admit light rays to the film in that magazine which is supported by said housing; a displacing member mounted in said housing for movement between three positions the first and the second of which it respectively assumes in response to engagement with the markers of magazines containing first and second types of film; movable selector means for moving said displacing member to the third of said positions; conversion filter means movable between operative and idle positions respectively located in and outside of the path of light rays passing through said objective; an operative connection between said displacing member and said filter means for moving said filter means from one of its positions to the other position in response to movement of said displacing member to third position; and detent means for releasably holding said selector means in a position corresponding to the third position of said displacing member, said detent means comprising a follower controlled by said displacing member and arranged to hold said selector means only when said displacing member engages the marker of a magazine containing the second type of film.

4. In a camera for use with magazines containing two different types of film and provided with different markers each indicative of the respective film type, a housing for detachably supporting one magazine at a time; an objective supported by said housing and arranged to admit light rays to the film in that magazine which is supported by said housing; a displacing member mounted in said housing for movement between three positions the first and the second of which it respectively assumes in response to engagement with the markers of magazines containing first and second types of film, said displacing member comprising a pair of cams; movable selector means for moving said displacing member to the third of said positions; conversion filter means movable between operative and idle positions respectively located in and outside of the path of light rays passing through said objective; an operative connection between said displacing member and said filter means for moving said filter means from one of its positions to the other position in response to movement of said displacing member to third position, said operative connection comprising a first follower coupled with said filter means and arranged to track one of said cams to move said filter means between operative and idle positions; a second follower for tracking the other of said cams; and detent means provided on said selector means and cooperating with said second follower to hold said selector means in a position corresponding to the third position of said displacing member.

5. A structure as set forth in claim 4, wherein said second follower is reciprocable by said other cam in a direction substantially at right angles to the direction of movement of said displacing member.

6. A structure as set forth in claim 4, wherein said detent means comprises a resilient element attached to said selector means.

7. A structure as set forth in claim 4, wherein said one cam and said first follower cooperate to move the filter means to idle position in response to movement of said displacing member to third position.

8. In a camera for use with magazines containing two different types of film and provided with different markers each indicative of the respective film type, a housing for detachably supporting one magazine at a time; an objective supported by said housing and arranged to admit light rays to the film in that magazine which is supported by said housing; a displacing member mounted in said housing for movement between three positions the first and second of which it respectively assumes in response to engagement with the markers of magazines containing first and second types of film, said displacing member comprising a slide which is reciprocable between said positions thereof; movable selector means for moving said displacing member to the third of said positions, said selector means comprising a lever which is rockable with reference to said housing; conversion filter means movable between operative and idle positions respectively located in and outside of the path of light rays passing through said objective; an operative connection between said displacing member and said filter means for moving said filter means from one of its positions to the other position in response to movement of said displacing member to third position; and a coupling between said slide and said lever, said coupling comprising a post provided on said lever and a slot provided in said slide and receiving said post, said post being located at one end of said slot in the second position of said slide so that it can move the slide to said third position in response to rocking of said lever.

9. In a camera for use with magazines containing two different types of film and provided with different markers each indicative of the respective film type, a housing for detachably supporting one magazine at a time; an objective supported by said housing and arranged to admit light rays to the film in that magazine which is supported by said housing; a displacing member mounted in said housing for movement between three positions the first and the second of which it respectively assumes in response to engagement with the markers of magazines containing first and second types of film; movable selector means for moving said displacing member to the third of said positions; conversion filter means movable between operative and idle positions respectively located in and outside of the path of light rays passing through said objective; an operative connection between said displacing member and said filter means for moving said filter means from one of its positions to the other position in response to movement of said displacing member to third position; and resilient means for biasing said selector means in a direction other than that in which said selector means is moved by hand to move said displacing member to third position.

10. A structure as set forth in claim 9, wherein said selector means remains in a position of rest in the first and second positions of said displacing member and said resilient means tends to maintain said selector means in such position of rest.

11. In a camera for use with magazines containing two different types of film and provided with different markers each indicative of the respective film type, a housing for detachably supporting one magazine at a time; an objective supported by said housing and arranged to admit light rays to the film in that magazine which is supported by said housing; a displacing member mounted in said housing for movement between three positions the first and the second of which it respectively assumes in response to engagement with the markers of magazines containing first and second types of film; movable selector means for moving said displacing member to the third of said positions, said selector means being movable from a position of rest corresponding to the first and second positions of said displacing member to another position corresponding to the third position of said displacing member; conversion filter means movable between operative and idle positions respectively located in and outside of the path of light rays passing through said objective; an operative connection between said displacing member and said filter means for moving said filter means from one of its positions to the other position in response to movement of said displacing member to third position; and indicator means including an index movable by said selector means between exposed and concealed positions, said index being exposed in the position of rest of said selector means and said indicator means further comprising a shaft connected with said index and turnable between two spaced positions respectively corresponding to the exposed and concealed positions of said index, an adjusting member movable by said selector means and arranged to turn said index to exposed position via said shaft in response to movement of said selector means to the position of rest, and resilient means for permanently biasing said adjusting member to a position in which said adjusting member turns said shaft to a position corresponding to the concealed position of said index.

12. In a camera for use with magazines containing two different types of film and provided with different markers each indicative of the respective film type, a housing for detachably supporting one magazine at a time; an objective supported by said housing and arranged to admit light rays to the film in that magazine which is supported by said housing; a displacing member mounted in said housing for movement between three positions the first and the second which it respectively assumes in response to engagement with the markers of magazines containing first and second types of film; movable selector means for moving said displacing member to the third of said positions, said selector means being movable from a position of rest corresponding to the first and second positions of said displacing member to another position corresponding to the third position of said displacing member; conversion filter means movable between operative and idle positions respectively located in and outside of the path of light rays passing through said objective; an operative connection between said displacing member and said filter means for moving said filter means from one of its positions to the other position in response to movement of said displacing member to third position; and indicator means including an index movable by said selector means between exposed and concealed positions, said index being exposed in the position of rest of said selector means and said indicator means further comprising a second index movable by said selector means between exposed and concealed positions, said second index being exposed in the other position of said selector means.

13. A structure as set forth in claim 12, wherein said indicator means further comprises a shaft conencted with said second index and turnable by said selector means from a first position to a second position corresponding to the exposed position of said second index, and resilient means for permanently biasing said shaft to said first position.

14. In a camera for use with magazines containing two different types of film including daylight film and artificial-light film and provided with different markers each indicative of the respective film type, a housing for detachably supporting one magazine at a time; an objective supported by said housing and arranged to admit light rays to the film in that magazine which is supported by said housing; a displacing member mounted in said housing for movement between three positions the first and the second of which it respectively assumes in response to engagement with the markers of magazines containing daylight film and artificial-light film; movable selector means for moving said displacing member to the third of said positions; conversion filter means movable between operative and idle positions respectively located in and outside of the path of light rays passing through said objective, said filter means being of the type allowing for utilization of artificial-light film in daylight, an operative connection between said displacing member and said filter means for moving said filter means from one of its positions to the other position in response to movement of said displacing member to third position, said filter means respectively assuming its operative and idle positions in the second and third positions of said displacing member; and coupling means connecting said selector means with said displacing member only when said displacing member assumes said second or third position.

15. In a camera for use with magazines containing two different types of film and provided with different markers each indicative of the respective film type, a housing for detachably supporting one magazine at a time; an objective supported by said housing and arranged to admit light rays to the film in that magazine which is supported by said housing; a displacing member mounted in said housing for movement between three positions the first and the second of which it respectively assumes in response to engagement with the markers of magazines containing first and second types of film, said displacing member comprising a pair of motion transmitting means; movable selector means for moving said displacing member to the third of said positions; conversion filter means movable between operative and idle positions respectively located in and outside of the path of light rays passing through said objective; an operative connection between said displacing member and said filter means for moving said filter means from one of its positions to the other position in response to movement of said displacing member to third position, said operative connection comprising first motion receiving means operatively connected with said filter means and cooperating with one of said motion transmitting means to move said filter means between operative and idle positions; second motion receiving means cooperating with the other of said motion transmitting means; and detent means cooperating with said second motion receiving means to hold said selector means in a position corresponding to the third position of said displacing member.

16. A structure as set forth in claim 15, wherein said first motion receiving means maintains said filter means in operative position in the second position of said displacing member and in idle position in the first position of said displacing member.

17. A structure as set forth in claim 16, wherein said first motion receiving means maintains said filter means in idle position in response to movement of said displacing member to its third position.

18. A structure as set forth in claim 15, further comprising index means controlled by said displacing member for indicating the type of film in that magazine which is supported by said housing.

19. A structure as set forth in claim 15, wherein said selector means comprises a lever which is rockable with reference to said housing and said displacing member comprises a slide which is reciprocable between said positions thereof, and further comprising a coupling between said slide and said lever.

20. A structure as set forth in claim 15, wherein said selector means is movable from a position of rest corresponding to the first and second positions of said displacing member to another position corresponding to the third position of said displacing member, and further comprising indicator means including an index movable by said selector means between exposed and concealed positions, said index being exposed in the position of rest of said selector means.

21. A structure as set forth in claim 20, further comprising means providing a field of view, said index being located in said field of view in the exposed position thereof.

22. A structure as set forth in claim 21, wherein said last named means comprises a viewfinder.

23. A structure as set forth in claim 15, wherein said camera is a motion picture camera and wherein each of said magazines comprises a front wall which is provided with a marker.

24. A structure as set forth in claim 15, wherein the first type of film is a daylight film and the second type of film is an artificial-light film, said conversion filter means being of the type allowing for utilization of the second type of film in daylight and respectively assuming its operative and idle positions in the second and third positions of said displacing member.

25. A structure as set forth in claim 15, wherein said selector means comprises a selector member movable between a position of rest and another position corresponding to the third position of said displacing member, and manually operable actuating means for moving the selector member between said positions thereof.

26. A structure as set forth in claim 25, further comprising means for indicating the positions of said selector member.

27. A structure as set forth in claim 15, further comprising resilient means for permanently biasing said displacing member to one of said positions thereof.

References Cited

UNITED STATES PATENTS

| 3,120,791 | 2/1964 | Bundschuh et al. | 95—11 |
| 3,208,363 | 9/1965 | Easterly et al. | 95—11 |
| 3,312,158 | 4/1967 | MacMillin et al. | 95—10 |
| 3,314,344 | 4/1967 | Anwyl et al. | 95—10 |

NORTON ANSHER, Primary Examiner.

F. L. BRAUN, Assistant Examiner.

U.S. Cl. X.R.

352—72